United States Patent
Röper et al.

(10) Patent No.: US 6,849,769 B2
(45) Date of Patent: Feb. 1, 2005

(54) METHOD FOR THE CONTINUOUS HYDROFORMYLATION OF POLYAKENES HAVING 30 TO 700 CARBON ATOMS

(75) Inventors: Michael Röper, Wachenheim (DE); Heinrich-Josef Blankertz, Forst (DE); Armin Volker Grenacher, Mutterstadt (DE); Roland Krokoszinski, Weisenheim a.Berg (DE); Willi Schönmann, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 139 days.

(21) Appl. No.: 10/363,660

(22) PCT Filed: Sep. 11, 2001

(86) PCT No.: PCT/EP01/10500

§ 371 (c)(1),
(2), (4) Date: Mar. 5, 2003

(87) PCT Pub. No.: WO02/22696

PCT Pub. Date: Mar. 21, 2002

(65) Prior Publication Data

US 2004/0015024 A1 Jan. 22, 2004

(30) Foreign Application Priority Data

Sep. 12, 2000 (DE) .......................................... 100 45 056

(51) Int. Cl.[7] ........................... C07C 45/50; B01J 31/20; C08F 8/00
(52) U.S. Cl. ........................ 568/451; 568/444; 568/456; 585/706; 585/901
(58) Field of Search ................................... 568/444, 451, 568/456; 585/706, 901

(56) References Cited

U.S. PATENT DOCUMENTS

| | | | |
|---|---|---|---|
| 3,929,898 A | * 12/1975 | Nienburg et al. | ........... 568/453 |
| 4,832,702 A | 5/1989 | Kummer et al. | |
| 5,919,987 A | 7/1999 | Kneuper et al. | |
| 6,020,441 A | 2/2000 | Zeller et al. | |
| 6,331,656 B1 | 12/2001 | Blankertz et al. | |

FOREIGN PATENT DOCUMENTS

| | | | |
|---|---|---|---|
| WO | 90/05711 | 5/1990 | |
| WO | WO 9005711 A1 * | 5/1990 | ........... C07C/29/16 |
| WO | 95/24431 | 9/1995 | |

OTHER PUBLICATIONS

M.DiSerio et al., J.Mol.Cat. 69 (1991) 1–14.

* cited by examiner

Primary Examiner—Kelechi C. Egwim
(74) Attorney, Agent, or Firm—Keil & Weinkauf

(57) ABSTRACT

Essentially monounsaturated polyalkylenes having from 30 to 700 carbon atoms are continuously hydroformylated by a process in which i) a hydroformylation-active cobalt carbonyl catalyst is prepared from a catalyst precursor dissolved in an aqueous phase in the absence of the polyalkylenes, ii) the polyalkylenes are hydroformylated by means of synthesis gas in the presence of the cobalt carbonyl catalyst in a reaction zone, iii) the cobalt carbonyl catalyst is separated from the output from the reaction zone with at least partial reformation of the catalyst precursor and the catalyst precursor is recirculated to step i).

13 Claims, 3 Drawing Sheets

METHOD FOR THE CONTINUOUS HYDROFORMYLATION OF POLYAKENES HAVING 30 TO 700 CARBON ATOMS

The present invention relates to a process for the continuous hydroformylation of essentially monounsaturated polyalkenes having from 30 to 700 carbon atoms.

Polybutenylamines are valued fuel and lubricant additives. They are advantageously prepared by hydroformylation of polybutene or polyisobutene and subsequent Mannich reaction or hydrogenative amination of the oxo product.

EP 244 616 describes a process for preparing polybutylamines and polyisobutylamines and illustrates a batchwise hydroformylation of polybutene using cobalt octacarbonyl on a laboratory scale.

WO 90/05711 relates to a 1-hydroxymethylpolyolefin obtainable by hydroformylation of a polyolefin. In an example, the batchwise hydroformylation of polybutene is illustrated on a laboratory scale using a cobalt carbonyl catalyst.

M. Di Serio et al., J. Mol. Catal. 69 (1991) 1–14, describe kinetic studies on the hydroformylation of polyisobutene. The hydroformylation experiments were carried out in the batch mode using cobalt acetylacetonate.

WO 95/24431 describes polyolefins having terminal aldehyde or hydroxyl substituents and derivatives thereof, e.g. alkylamino derivatives. The latter are obtainable by aminomethylation or hydroformylation and reductive amination. A batchwise hydroformylation of an ethylene-propylene-dicyclopentadiene terpolymer using $Co_2(CO)_8$ is illustrated on a laboratory scale.

A continuous hydroformylation process is desirable for economical industrial-scale production of oxo products of polyalkylenes. To achieve this, it is necessary to separate the cobalt catalyst from the hydroformylation products and, if necessary after chemical transformation, to return it to the hydroformylation reaction. The catalyst homogeneously dissolved in the hydroformylation products is particularly advantageously separated off by making it heterogeneous, for example by converting it into a water-soluble form and extracting it into an aqueous phase. The water-soluble form is then converted back into the active catalyst.

A continuous process of this type is disclosed in WO 98/12235. Here, a polyisobutene-containing organic phase and an acidic aqueous cobalt formate solution are introduced simultaneously into a hydroformylation reactor. After the reaction, the reaction mixture is depressurized and the cobalt catalyst is recovered by extraction with an aqueous acidic solution in the presence of atmospheric oxygen and a polymeric emulsion breaker. In the process described in WO 98/12235, the in-situ formation of the cobalt catalyst, the extraction of the cobalt catalyst into the organic phase and the hydroformylation of the polyalkylene take place in one step in the reaction zone under hydroformylation conditions.

It has become evident that the selectivity of the known processes in respect of the desired products polyalkylenealdehyde, polyalkylene alcohol and/or polyalkylene ester at a given reactor throughput or the permissible reactor throughput without loss of selectivity are in need of improvement.

We have now, surprisingly, found that a high space-time yield together with a high selectivity to the desired product is achieved in the continuous hydroformylation of polyalkylenes when formation of the catalyst is carried out beforehand, i.e. outside the hydroformylation zone.

This finding is surprising since it may be assumed that the in-situ formation of the catalyst proceeds sufficiently rapidly under the conditions of the hydroformylation of polyalkylenes and, in view of the relatively low double bond concentration in the polyalkylenes compared to low molecular weight olefins, there is sufficient catalyst available in the hydroformylation zone. However, the in-situ catalyst formation obviously involves the formation, as intermediates, of low oxidation state cobalt compounds which display a catalytic activity of unsatisfactory selectivity and, for example, promote the hydrogenation of the polyalkylenes as against the 1-hydro-2-carboaddition(hydroformylation).

DE-OS 2139630 describes a process for preparing predominantly straight-chain aldehydes by hydroformylation of olefinically unsaturated compounds having from 2 to 20 carbon atoms, in which aqueous cobalt salt solutions are treated with carbon monoxide and hydrogen in a first step, the aqueous solution is then extracted with an organic phase in a second step and the organic phase and a mixture of carbon monoxide and hydrogen are transferred to a third step where, optionally after introduction of the olefinically unsaturated compounds if none or only part of these have been used for the extraction in the second step, the hydroformylation is carried out. Application of this process to the hydroformylation of polyalkylenes was far from obvious, since DE 2139630 is expressly directed at linear aldehydes, while polyalkylenes (and the aldehydes obtained therefrom) are always moderately to strongly branched.

The present invention provides a process for the continuous hydroformylation of essentially monounsaturated polyalkylenes having from 30 to 700 carbon atoms, in which i) a hydroformylation-active cobalt carbonyl catalyst is prepared from a catalyst precursor dissolved in an aqueous phase in the absence of the polyalkylenes, ii) the polyalkylenes are hydroformylated by means of synthesis gas in the presence of the cobalt carbonyl catalyst in a reaction zone, iii) the cobalt carbonyl catalyst is separated from the output from the reaction zone with at least partial reformation of the catalyst precursor and the catalyst precursor is recirculated to step i).

Suitable polyalkylenes have from 30 to 700 carbon atoms, in particular from 40 to 400 carbon atoms. The polyalkylenes are preferably oligomers or polymers of $C_2$–$C_6$-alkenes, in particular $C_3$–$C_6$-alkenes, especially $C_3$–$C_4$-alkenes, with the oligomers or polymers having essentially one olefinic double bond. Particularly suitable polyalkylenes are polymers of butene or isobutene, especially those containing at least 50% of terminal double bonds in the form of vinyl or vinylidene groups. Suitable polyisobutenes are disclosed, for example, in DE-A 27 02 604 or U.S. Pat. No. 5,286,823.

Catalyst precursors which can be used are, in particular, water-soluble cobalt(II) salts and salts of the cobalt tetracarbonyl anion.

Suitable cobalt(II) salts are, in particular, cobalt(II) carboxylates, such as cobalt formate, cobalt acetate or cobalt ethylhexanoate, and also cobalt acetylacetonate. The hydroformylation-active cobalt carbonyl catalyst can be prepared from an aqueous cobalt(II) salt solution by reaction with synthesis gas.

The conversion of the $Co^{2+}$ from the aqueous cobalt(II) salt solution into a hydroformylation-active cobalt carbonyl catalyst, i.e. hydridocobalt carbonyl, occurs according to the reaction equation:

$$2Co^{2+} + 8CO + 3H_2 \rightarrow 2HCo(CO)_4 + 4H^+$$

The equation shows that preparation of the catalyst requires a synthesis gas in which CO and $H_2$ are present in a ratio of 8:3. Since, however, a higher concentration of $H_2$ has no adverse effect on the reaction, it is advantageous to carry out the preparation of the catalyst from the aqueous cobalt(II) salt solution using the same synthesis gas as is also used for the hydroformylation reaction so as not to have to handle different gas streams. The aqueous cobalt(II) salt solution is generally treated with synthesis gas at from 50 to 150° C., preferably from 80 to 120° C., and a pressure from 50 to 400 bar, preferably from 200 to 300 bar. The synthesis gas can comprise from 10 to 90% of CO and from 90 to 10% of $H_2$, preferably from 30 to 70% of CO and from 70 to 30% of $H_2$. The aqueous cobalt(II) salt solution is preferably brought to a pH of from about 2 to 5, preferably from 3 to 4. The adjustment of the pH can be carried out using, for example, formic acid or acetic acid. The cobalt concentration in the aqueous solution is generally from 0.5 to 2% by weight, preferably from 1.1 to 1.7% by weight.

Apparatuses suitable for the reaction of the cobalt(II) salt solution with the synthesis gas are customary apparatuses for gas/liquid reactions, for example stirred vessels with sparging stirrers, bubble columns or trickle bed columns. The trickle bed can comprise shaped bodies made of, for example, steel, glass, aluminum oxide, silicon dioxide, steatite, acid ion exchangers or activated carbon and also noble metals such as palladium deposited on activated carbon. In certain cases, it may be advantageous to use a certain amount of an organic phase, e.g. crude hydroformylation product, in the preparation of the catalyst. For example, the organic phase together with the cobalt(II) salt solution can be passed through the trickle bed. Since the cobalt carbonyl catalyst has a low solubility in water but a high solubility in organic media, undesirable cobalt deposits can be avoided in this way. However, preference is generally given to carrying out the preparation of the catalyst in the absence of any organic phase.

This gives an aqueous solution laden with the cobalt carbonyl catalyst, and this solution is either introduced as such into the reaction zone or the catalyst is separated from it and introduced as gas phase or organic liquid phase into the reaction zone, as is explained below.

To separate off the cobalt carbonyl catalyst and reform cobalt(II) salts, the output from the reaction zone is appropriately treated with oxygen or air in the presence of an aqueous phase. In this procedure, the cobalt carbonyl catalyst is decomposed by oxidation and the cobalt atom is formally converted from the oxidation state −1 to +2 and can then be removed by extraction with the aqueous phase. This step is also referred to as "oxidative cobalt removal" and is described in more detail below in the context of a preferred embodiment of the process of the present invention.

As an alternative, the output from the reaction zone can also be treated with an aqueous solution containing cobalt (II) ions in the absence of oxygen, forming a water-soluble complex in the form of $Co[Co(CO)_4]_2$ which is then oxidized by means of oxygen or air to give the uniformly divalent form of cobalt. Such a process is, for example, useful when the cobalt carbonyl catalyst is not to be destroyed quantitatively by oxidation, but part thereof is to be separated off beforehand in undecomposed form by means of a stripping gas. The stripping gas treatment of the reaction product can advantageously be combined with the stripping of the cobalt carbonyl catalyst from an aqueous solution in which it is present, as is indicated below for a preferred embodiment of the process of the present invention.

Suitable catalyst precursors include not only aqueous cobalt(II) salt solutions but also an aqueous solution of a salt of the cobalt tetracarbonyl anion, in particular the sodium salt. This can be acidified, for example with sulfuric acid, to produce the cobalt carbonyl catalyst. To separate off the cobalt carbonyl catalyst and reform the cobalt tetracarbonyl anion, the output from the reaction zone can be treated with the aqueous solution of a base, e.g. sodium carbonate solution, which results in conversion of the hydridocobalt carbonyl back into a water-soluble salt thereof.

The above methods of preparing the catalyst give an aqueous phase comprising the cobalt carbonyl catalyst. The preformed cobalt carbonyl catalyst can be transferred from the aqueous phase into the organic phase outside the reaction zone. Alternatively, the aqueous phase comprising the cobalt carbonyl catalyst is introduced as such into the reaction zone. In the first case, the cobalt carbonyl catalyst is dissolved in an organic phase comprising the polyalkylenes and the organic phase laden with the cobalt carbonyl catalyst is introduced into the reaction zone. To dissolve the cobalt carbonyl catalyst in the organic phase, the aqueous phase comprising the cobalt carbonyl catalyst can be brought into contact with the organic phase, with the cobalt carbonyl catalyst being at least partly extracted into the organic phase.

Suitable apparatuses for the extraction of the cobalt carbonyl catalyst from the aqueous phase into the organic phase are all industrially customary apparatuses which are suitable for an extraction under atmospheric pressure or under superatmospheric pressure. Use is advantageously made of countercurrent extraction apparatuses which can be filled with packing elements, e.g. Raschig rings, Pall rings or glass spheres, or have labyrinth packing to create a large mass transfer area. As alternatives, apparatuses operating according to the mixer-settler principle or intensively stirred vessels are also suitable.

The extraction is advantageously carried out using the total amount of organic phase which is subsequently introduced into the reaction zone, i.e. the total amount of polyalkylene or the mixture of alkylene and solvents which are additionally used. The flow is preferably chosen so that a phase ratio of aqueous phase to organic phase of from about 1:1 to 1:50, in particular from 1:10 to 1:20, is obtained.

The conditions in the catalyst extraction are chosen so that no hydroformylation occurs during the catalyst extraction. In general, a temperature of from 5 to 150° C., preferably from 70 to 100° C., and a pressure of from 50 to 400 bar, preferably from 250 to 300 bar, are suitable. If the cobalt catalyst is prepared by treating an aqueous cobalt(II) salt solution with synthesis gas, pressure and temperature conditions comparable to those in the preparation of the catalyst are also suitable for the catalyst extraction.

In place of a liquid/liquid extraction, it is also possible to treat the aqueous phase comprising the cobalt carbonyl catalyst, in the presence or absence of the output from the reaction zone which likewise comprises cobalt carbonyl catalyst, with a stripping gas, in particular synthesis gas, and to bring the stripping gas laden with the cobalt carbonyl catalyst into contact with an organic phase comprising the polyalkylenes, with the cobalt carbonyl catalyst being at least partly absorbed in the organic phase.

As an alternative, an organic phase comprising the polyalkylenes and the aqueous phase comprising the cobalt carbonyl catalyst can be introduced simultaneously into the reaction zone, with extraction of the cobalt carbonyl catalyst into the organic phase occurring in the reaction zone in this case. For this purpose, the aqueous phase comprising the cobalt carbonyl catalyst and the organic phase comprising the polyalkylenes are introduced into the reaction zone in such a way that good mixing of the phases occurs and a very high mass transfer area is generated. For introducing the phases, it is possible to use the feed devices known to those skilled in the art, for example turbulence tubes filled with packing or mixing nozzles for multiphase systems. The two phases can optionally be introduced together with the synthesis gas via a line into the reaction zone.

If the aqueous phase comprising the cobalt carbonyl catalyst is introduced together with the organic phase into the reaction zone, it has to be ensured that the aqueous phase does not accumulate in the reaction zone, which can lead to a gradual slowing and possibly complete cessation of the hydroformylation reaction. This can be achieved, for example, by taking off the reaction product at a plurality of points on the reaction zone or, when using a plurality of reaction zones, at least the first reaction zone, e.g. the first reactor of a reactor cascade. If the reaction product is, for example, taken off only at the top of the reactor, the amount of aqueous phase which is introduced into the reaction zone and is necessary to achieve a sufficient catalyst concentration in the reaction zone is sometimes not completely discharged in dissolved or suspended form with the reaction mixture. The denser aqueous phase accumulates near the bottom of the reactor. For this reason, reaction product is taken off both at the top of the reactor and also from the bottom region of the reactor in a preferred embodiment. The reaction product from the bottom region generally comprises from 10 to 100% by volume, in particular from 30 to 50% by volume, of aqueous phase.

The organic phase advantageously comprises an organic solvent in addition to the polyalkylenes. Aromatic or aliphatic hydrocarbons are preferred as solvents. Examples which may be mentioned are benzene, toluene, xylenes, ethylbenzenes, cyclohexane, paraffin fractions, in particular linear or branched $C_6$–$C_{30}$-alkanes. Preferred solvents are essentially insoluble in water and are readily miscible with the polyalkylenes and with the cobalt carbonyl catalyst.

The temperature in the hydroformylation is generally from 100 to 250° C., in particular from 120 to 200° C. The reaction is preferably carried out at a pressure in the range from 150 to 400 bar, in particular from 200 to 300 bar.

Suitable pressure-rated reactors for hydroformylation are known to those skilled in the art. They include the generally customary reactors for gas/liquid reactions, e.g. tube reactors, stirred vessels, gas recycle reactors, bubble columns, etc., which may be divided by internals. A suitable reactor is, for example, an upright high-pressure bubble column reactor which may be provided with coaxial tubular internals. For the purposes of the present invention, a "reaction zone" is the region of a reactor in which appropriate pressure and temperature conditions prevail and the reactants come into contact with one another in such a way that the hydroformylation reaction occurs. To achieve the highest possible conversions, it can be advantageous to carry out the hydroformylation in at least two successive reaction zones which may be located in one or more reactors. For the purposes of the present invention, a plurality of reaction zones is said to be present when essentially no backmixing takes place between them. The formation of a plurality of reaction zones in one reactor can be achieved by suitable cascading of the reactor. As an alternative, two or more reactors can be connected in series in order to carry out the hydroformylation in a plurality of reaction zones. If appropriate, fresh synthesis gas can be introduced into the second reaction zone or a further reaction zone. Uniform transport of material from the first reaction zone to the second or further reaction zone is preferably achieved by maintaining a constant pressure difference of a few bar, e.g. from 2 to 5 bar.

Synthesis gas is an industrial mixture of carbon monoxide and hydrogen. The composition of the synthesis gas used in the process of the present invention can vary within a wide range. The molar ratio of carbon monoxide to hydrogen is generally from about 10:1 to 1:10, in particular from 2.5:1 to 1:2.5. A preferred ratio is from about 40:60 to 50:50.

The process of the present invention is preferably carried out so that the concentration of the cobalt carbonyl catalyst, calculated as cobalt, is from 0.05 to 1.5% by weight, in particular from 0.1 to 0.5% by weight, based on the organic phase introduced into the reaction zone.

A preferred embodiment of the process of the present invention is a process in which a) an aqueous cobalt(II) salt solution is brought into intimate contact with synthesis gas to form a cobalt carbonyl catalyst, b) the aqueous phase comprising the cobalt carbonyl catalyst is brought into contact with an organic phase comprising the polyalkylenes, with the cobalt carbonyl catalyst being at least partly extracted into the organic phase, c) the organic phase is hydroformylated by means of synthesis gas at superatmospheric pressure and elevated temperature in the reaction zone, d) the output from the reaction zone is treated with oxygen in the presence of aqueous cobalt(II) salt solution, with the cobalt carbonyl catalyst being decomposed to form cobalt(II) salts and the latter being back-extracted into the aqueous phase, and e) the aqueous cobalt(II) salt solution is recirculated to step a).

The extraction of the cobalt carbonyl catalyst into the polyalkylene-containing organic phase in step b) can be carried out either outside the reaction zone or simultaneously with the hydroformylation in the reaction zone, with reference being made to the above statements to avoid repetition. In view of the lower outlay in terms of apparatus, preference is usually given to carrying out the catalyst extraction in the reaction zone, i.e. the aqueous phase and the organic phase come into contact with one another only in the reaction zone.

In the cobalt removal step (step d), the output from the reaction zone is treated with molecular oxygen, usually in the form of air, in the presence of aqueous weakly acidic cobalt(II) salt solution. In this step, the cobalt present in the cobalt carbonyl catalyst is oxidized in accordance with the following equation from the oxidation state −1 to +2 and is removed from the organic phase of the reaction mixture by extraction with the aqueous phase:

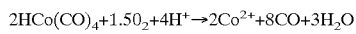
$$2HCo(CO)_4 + 1.5O_2 + 4H^+ \rightarrow 2Co^{2+} + 8CO + 3H_2O$$

In general, the amount of aqueous phase used is from 0.1 to 10 times, preferably from 0.1 to 1 times, in particular from 0.5 to 0.9 times, the amount of organic phase to be treated, measured in kg/kg. As a result of this measure, the aqueous phase is present as a disperse phase in the form of small droplets and the organic phase is then present as a water-in-oil emulsion. It has been found to be advantageous to set the phase ratio indicated, since the subsequent separation of the phases is then made substantially easier.

The cobalt removal is generally carried out at a pH of from 2 to 6, preferably from 3 to 4. The pH can be appropriately controlled by addition of a carboxylic acid, in particular formic acid or acetic acid. The acid content of the aqueous phase should in each case be sufficient to take up all the cobalt in accordance with the above equation.

It has been found to be advantageous to use the cobalt-depleted cobalt(II) salt solution obtained after preparation and extraction of the catalyst as acidic aqueous solution in the cobalt removal step. The back-extraction of the cobalt(II) salts in the cobalt removal step results in an increase in the concentration to essentially the original cobalt concentration. The aqueous cobalt(II) salt solution obtained in this way in the cobalt removal step can then be recirculated to the catalyst preparation step. The concentration of cobalt(II) salts in the circuit is advantageously chosen so that the cobalt(II) salts remain in solution and do not precipitate. A cobalt(II) concentration in the circuit of the cobalt(II) salt solution of from 0.5 to 2% by weight of cobalt has been found to be useful.

At the same time as it is brought into contact with the acidic aqueous phase, the output from the reaction zone is brought into contact with molecular oxygen, preferably in the form of air. The amount of molecular oxygen is selected so that it is at least twice, preferably 2.1 times, the amount of cobalt present in the output from the reaction zone. When air is used, this means that 2.7 standard $m^3$ of air are to be employed per gram of cobalt. The amount of oxygen preferably does not exceed 2.5 times the stoichiometrically required amount. To carry out the cobalt removal successfully, it has been found to be useful to bring the acidic aqueous phase into contact with air before it is brought into contact with the organic phase. In this way, the aqueous phase becomes saturated with the available oxygen, as a result of which the subsequent oxidation is not restricted by slow mass transfer taking place through a gas/liquid interface. The mixing of the aqueous phase and the gaseous phase comprising molecular oxygen can be carried out in any apparatus for carrying out gas/liquid reactions, e.g. in a bubble column, a mixing section, an intensively stirred mixing vessel or a two-fluid nozzle.

Cobalt removal is preferably carried out at elevated temperature. In general, temperatures of from 50 to 150° C., preferably from 100 to 120° C., are employed. The treatment can be carried out under atmospheric or superatmospheric pressure. It has been found to be particularly useful to employ a pressure of more than 1 bar, preferably from 5 to 50 bar. The residence time in the cobalt removal step can be varied within wide limits.

Intensive mixing of the organic and aqueous phases is desirable during cobalt removal. Mixing can be carried out, for example, in a stirred vessel, a two-fluid nozzle or a mixing section, e.g. a bed of packing elements. Suitable packing elements are Raschig rings, Pall rings, glass spheres and the like.

Subsequently, it is advantageous firstly to separate the gas phase from the two liquid phases and then to separate the aqueous phase from the organic phase. To separate the phases, the mixture of aqueous and organic phases can be introduced into a calming zone and separated. This is advantageously carried out in a horizontal, continuously operated phase separation vessel through which the phases flow at a low velocity. Due to the density difference between the phases, the emulsion separates under the action of gravity, so that the two phases are obtained one on top of the other in coherent form and largely free of extraneous phases. The aqueous phase obtained is virtually free of the organic phase, so that the cobalt(II) salt solution can be returned to the catalyst formation and cobalt removal steps without further work-up. The organic phase is generally obtained as a fine emulsion in which finely dispersed droplets of the aqueous phase are present. The fine emulsion is usually very stable and phase separation on the basis of the density difference requires a very long residence time. To accelerate the coalescence of the residual dispersed aqueous phase, one or more mechanical coalescence stages with an integrated or subsequent phase separation apparatus are advantageously utilized. Suitable apparatuses are in general separators with coalescence internals such as packing elements, coalescence surfaces or fine-pored elements. The fine dispersion is preferably passed from the top downward through a bed of packing elements. Wetting of the large surface area of the packing elements results in surface coalescence and at the same time to droplet/droplet coalescence due to droplet movement. In an advantageous embodiment, use is made of a vertical packed column in which the packing elements consist of a material which is wetted by the disperse aqueous phase and the bed of packing elements is flooded by the organic phase. Preference is given to using packed columns filled with packing elements made of metal, e.g. metal rings. The large droplets of aqueous phase which are formed separate out rapidly and can be taken off as a lower phase.

Emulsion breakers are advantageously used in the phase separation. Suitable emulsion breakers are, in particular, alkoxylated compounds as are customarily used in the petroleum industry to separate off salt-containing water. These are, for example, a) oligoamines, polyamines, oligoimines and polyimines alkoxylated with propylene oxide and optionally also ethylene oxide,
b) alkoxylated alkylphenol-formaldehyde resins and
c) ethylene oxide/propylene oxide block copolymers, and also
d) their polymeric acrylic esters, as are described in DE-A-2 227 546 and DE-A-2 435 713 (a), DE-A-2 013 820 (b), DE-A-1 545 215 (c) and DE-A-4 326 772 (d).

Particular preference is given to using an emulsion breaker obtained by reacting polyethyleneimine having a molecular weight of from 10,000 to 50,000 with such amounts of propylene oxide and optionally also ethylene oxide that the content of alkoxy units is from 90 to 99% by weight.

The amount of emulsion breakers which needs to be added to achieve the desired effect is generally from about 0.1 to 100 g/metric ton of organic phase used, preferably from 2 to 20 g/metric ton.

The emulsion breaker is preferably added continuously in diluted form. Dilution with an inert solvent, e.g. orthoxylene, aids handling and metering of the small amount required. The addition is advantageously carried out together with the addition of the aqueous extraction solution and the air under release of pressure, as a result of which the emulsion breaker is effectively mixed in.

A further preferred embodiment of the process of the present invention is a process in which a) a polyalkylene-containing organic phase laden with a cobalt carbonyl catalyst is hydroformylated by means of synthesis gas at superatmospheric pressure and elevated temperature in the reaction zone,
b) the output from the reaction zone is admixed with an aqueous acid and stripped by means of a stripping gas in the presence of an aqueous phase comprising a cobalt carbonyl catalyst, with the cobalt carbonyl catalyst being at least partly entrained by the stripping gas and partly converted into a water-soluble form and extracted into the aqueous phase,
c) the aqueous phase is treated with oxygen, with the water-soluble form of the cobalt carbonyl catalyst being decomposed to form cobalt(II) salts,
d) the aqueous cobalt(II) salt solution is brought into intimate contact with synthesis gas to form a cobalt carbonyl catalyst and the aqueous phase comprising the cobalt carbonyl catalyst is recirculated to step b), e) the stripping gas laden with the cobalt carbonyl catalyst from step b) is brought into contact with a polyalkylene-containing organic phase, with the cobalt carbonyl catalyst being at least partly absorbed in the organic phase, and the organic phase is recirculated to step a).

As aqueous acid in step b), formic acid is particularly useful. The process according to this embodiment can be carried out in a manner analogous to the process described in U.S. Pat. No. 5,434,318, which is hereby fully incorporated by reference.

A further preferred embodiment of the process of the present invention is a process in which a) an aqueous solution of a salt of the cobalt tetracarbonyl anion is acidified to form a hydroformylation-active cobalt carbonyl catalyst, b) the aqueous solution comprising the cobalt carbonyl catalyst is brought into intimate contact with an organic phase comprising the polyalkenes, with the cobalt carbonyl catalyst being at least partly extracted into the organic phase, c) the organic phase is hydroformylated in the reaction zone, d) the output from the reaction zone is treated with an aqueous solution of a base to reform the cobalt tetracarbonyl anion, and the aqueous solution is recirculated to step a).

The process according to this embodiment can be carried out in a manner analogous to the process described in H. Lemke, "Select the Best Oxo Catalyst Cycle" Hydrocarbon Processing Petrol. Refiner, 45(2) (February 1966), 148–152.

The process of the present invention will now be described in more detail with reference to the accompanying FIGS. 1 to 3. Self-evident details which are not necessary for an understanding of the present invention have been left out for reasons of clarity.

Figure 1:
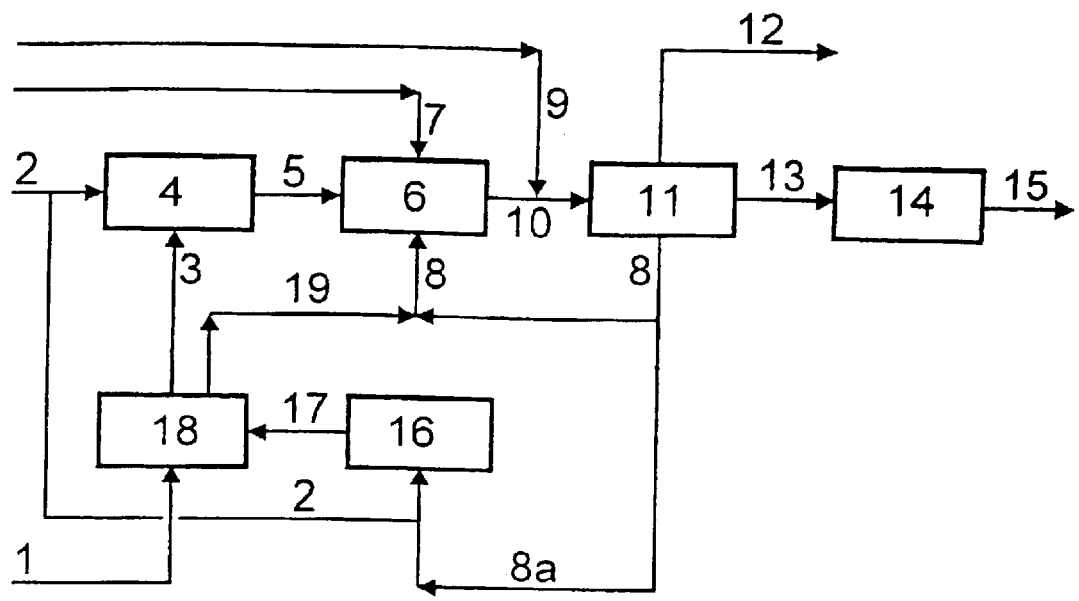
FIG. 1 schematically shows a plant suitable for carrying out the process of the present invention with separate extraction stage. An aqueous cobalt(II) salt solution is fed via line (8a) into a carbonyl formation zone (16) and synthesis gas is fed into this zone via line (2). The output from the carbonyl formation zone (16) is transferred via line (17) to the extraction zone (18) into which a polyalkylene or a mixture of polyalkylene and a solvent is fed at the same time via line (1). The cobalt carbonyl catalyst formed largely goes into the polyalkylene-containing phase which is then, after phase separation, conveyed via line (3) to the reaction system (4). The aqueous solution which is depleted in cobalt carbonyls and still contains cobalt(II) salt is conveyed via lines (19) and (8) to the cobalt removal step (6). In the reaction system (4), which can comprise a plurality of reactors or one reactor with suitable internals, the reaction of the polyalkylene with synthesis gas takes place under hydroformylation conditions to form hydroformylation products. The output from the reaction system is passed via line (5) to the cobalt removal step (6) and is treated with air via line (7) and an aqueous acidic cobalt(II) salt solution via line (8). Here, the oxidation state of the cobalt changes from −1 to +2 and the cobalt is dissolved in the acidic aqueous phase as cobalt(II) salt. Immediately after cobalt removal, an emulsion breaker is added via line (9). The crude product mixture is then conveyed via line (10) to a phase separation vessel (11). Here, the gas phase and the two liquid phases separate. The unreacted air and the carbon monoxide and hydrogen carried over from the synthesis stage are discharged via line (12). The aqueous phase which separates out is returned via line (8a) to the carbonyl formation zone (16). After phase separation (11), the organic phase, which still contains small amounts of aqueous phase, is passed via line (13) to a coalescence stage (14), e.g. a packed column filled with metal packing elements. After the coalesced aqueous phase has been separated off, the crude hydroformylation product can be passed via line (15) to further work-up.
Figure 2:
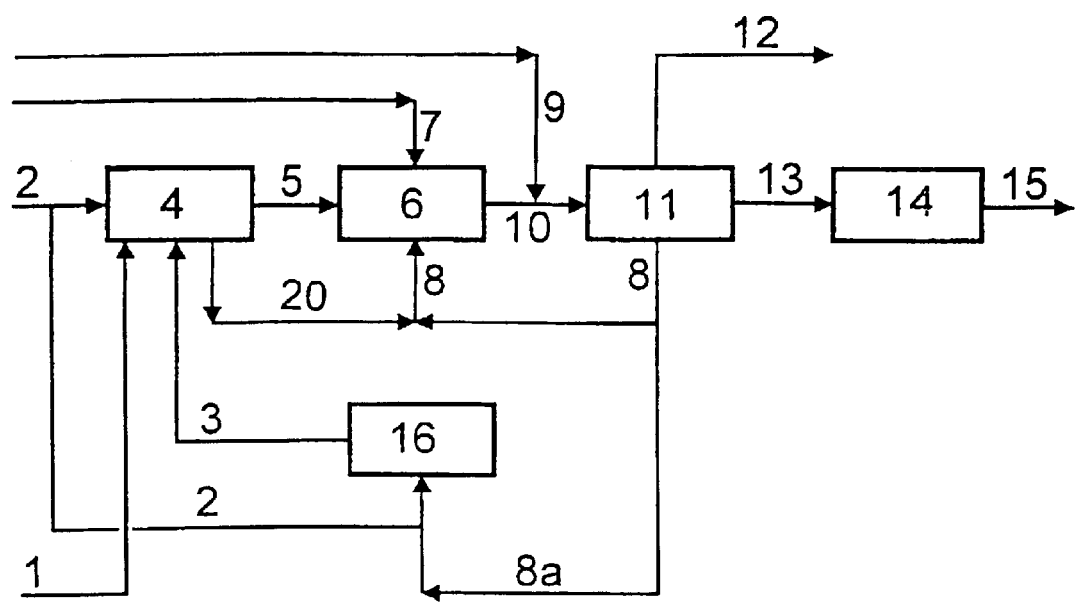
FIG. 2 shows an embodiment of the process of the present invention without a separate extraction stage. An aqueous cobalt(II) salt solution is fed via line (8a) to a carbonyl formation zone (16) and synthesis gas is fed in via line (2). The output from the carbonyl formation zone is fed via line (3) to the hydroformylation system (4) which comprises two reactors connected in series and into which synthesis gas via line (2) and the polyalkylene or a mixture of polyalkylene and solvent via line (1) are additionally introduced. The output from the reaction system is, as indicated above with reference to FIG. 1, conveyed via line (5) to the cobalt removal step (6). In addition, an aqueous phase depleted in cobalt carbonyls is taken off at the bottom of the first reactor of the hydroformylation system and conveyed via line (20) to the cobalt removal step (6). This discharge can be dispensed with if the aqueous phase which has been depleted in cobalt carbonyls is soluble or dispersible in the hydroformylation mixture. The further work-up is carried out as described above with reference to FIG. 1, with identical reference numerals having the same meaning.
Figure 3:
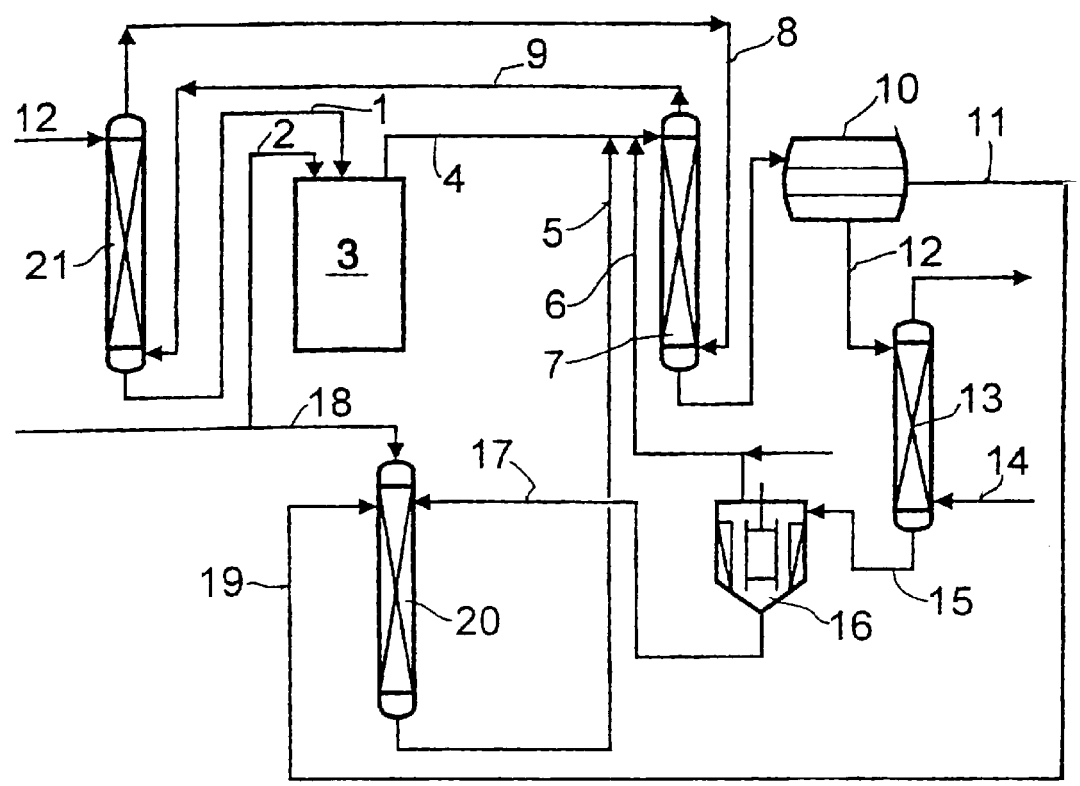
FIG. 3 shows an embodiment of the process of the present invention in which the preformed cobalt carbonyl catalyst is stripped by means of a stripping gas and absorbed in the organic phase to be hydroformylated. A cobalt carbonyl catalyst and polyalkylene-containing organic phase are fed via line (1) into the reactor (3) and synthesis gas is fed into the reactor via line (2). In the reactor (3), the hydroformylation reaction takes place at elevated temperature and superatmospheric pressure. The reaction product is discharged via line (4), and an aqueous solution of a carboxylic acid such as formic acid is added to it via line (6). The reaction product which has been treated in this way is treated with a stripping gas, e.g. synthesis gas, in the stripper (7) where part of the volatile cobalt carbonyl catalyst is carried out by the stripping gas and taken off via line (9). At the bottom of the stripper (7), a heterogeneous mixture of organic reaction product and the aqueous phase comprising dissolved cobalt compounds is taken off and conveyed to a phase separation vessel (10). The organic phase is taken off via line (11) and passed to further work-up. The aqueous phase is conveyed via line (12) to the cobalt removal apparatus (13) where it is treated with an oxygen-containing gas such as air and the soluble cobalt compounds are converted into cobalt(II) salts. The treated aqueous solution is conveyed via line (15) to an evaporator (16) where a more highly concentrated cobalt(II) salt solution and an aqueous carboxylic acid solution are obtained. The aqueous carboxylic acid solution can be recirculated via line (6) to acidify the organic reaction product from the hydroformylation. The concentrated cobalt(II) salt solution is conveyed via line (17) to the cobalt carbonyl generator (20) into which synthesis gas is additionally fed via line (18). In addition, a small amount of the crude hydroformylation product from which the cobalt has been removed is advantageously fed via line (19) to the cobalt carbonyl generator (20). In the cobalt carbonyl generator (20), a cobalt carbonyl catalyst is prepared from the dissolved cobalt(II) salts and is conveyed via line (5) to the stripper (7). The stripping gas laden with the cobalt carbonyl catalyst from the stripper (7) is conveyed via line (9) to the absorber (21) into which a polyalkylene-containing organic phase is fed via line (22). The stripping gas depleted in the cobalt carbonyl catalyst is fed back to the stripper (7) via line (8). The organic phase laden with the cobalt carbonyl catalyst is fed via line (1) to the reactor (3).

The process of the present invention is illustrated by the following examples.

EXAMPLES

Comparative Example 1
Use of Aqueous Cobalt Salt Solution as Hydroformylation Catalyst 3660 kg/h of a mixture of 1940 kg/h of polyisobutenes and 1720 kg/h of a $C_{10}$–$C_{14}$ paraffin fraction were fed into a hydroformylation reactor system. At the same time, 300 kg/h of aqueous acidic cobalt formate solution whose pH had been adjusted to about 3.4 by means of formic acid and which contained 1.3% by weight of cobalt were introduced into the system.

In the hydroformylation reactor system, the hydroformylation reaction took place at from 180 to 185° C. The reactor pressure of about 270 bar was kept constant by introduction of the necessary amount of synthesis gas.

After passing through the reactor section, the product was depressurized into a cobalt removal zone. Here, the pressure was reduced from about 270 bar to 20 bar. In addition, 2600 kg/h of cobalt salt solution of the abovementioned composition and 17 kg/h of air were fed into the cobalt removal zone. Immediately downstream of the outlet from the cobalt removal step, an emulsion breaker was added as dilute solution in such an amount that the concentration of breaker was 12 g per metric ton of reaction mixture. The emulsion breaker was a polyethyleneimine modified with propylene oxide (molecular weight of the polyethylenimine used for the preparation: about 20,000; content of propoxy units: 99% by weight, cf. WO 98/12235).

In a calming zone, 200 kg/h of depressurization gas were separated off and discharged into a collector system.

The liquid phases were separated from one another. The aqueous phase was largely free of organic constituents and the content of cobalt carbonyls was only 0.05% by weight.

The organic phase still contained about 0.7% by weight of extraneous phase. The further work-up was carried out as described in WO 98/12235. 93% of the polyisobutylene used had been reacted. 62% of the polyisobutene reacted had been converted into the desired products polyisobutylaldehyde, polyisobutyl alcohol or polyisobutyl ester. The polyisobutene conversion and the yields of polyisobutenealdehyde, polyisobutyl alcohol or polyisobutyl ester were determined by column chromatography and by determination of the parameters with which those skilled in the art are familiar.

Example 2
Use of Organic Cobalt Carbonyl Solutions as Hydroformylation Catalyst 208 kg/h of aqueous acidic cobalt formate solution whose pH had been adjusted to 3.4 by means of formic acid and which contained 1.3% by weight of cobalt were fed into a precarbonylation reactor. The conversion of the cobalt formate into cobalt carbonyls was carried out at 95° C. and 280 bar by means of a gas mixture of 40% by volume of CO and 59% by volume of $H_2$ (+1% of inert gases). Essentially all the gas necessary for carrying out the hydroformylation was passed through the precarbonylation reactor. This had a volume of 2.3 m³ and was filled with activated carbon. After passage through the precarbonylation reactor, 70% of the available cobalt had been converted into hydridocobalt carbonyl.

The output from the precarbonylation reactor was passed without depressurization to an extraction zone into which 3660 kg/h of a mixture of 1940 kg/h of polyisobutene and 1720 kg/h of a $C_{12}$–$C_{14}$ paraffin fraction were additionally introduced. In the extraction zone, consisting of a mixing zone and a calming zone, the cobalt carbonyls were largely transferred from the aqueous phase into the organic phase comprising the polyisobutene and the $C_{12}$–$C_{14}$ paraffin fraction. The 185 kg/h of aqueous phase depleted in cobalt carbonyls were passed to the cobalt removal step.

The 3700 kg/h of organic phase laden with cobalt carbonyls were fed to the hydroformylation system. The reaction system had a reaction volume of 21.7 m³, so that the space velocity through the reaction system was 0.17 kg/l*h. In the reaction system, the hydroformylation reaction took place at 181° C. The reaction pressure of 270 bar was kept constant by introduction of the necessary amount of synthesis gas which had been taken from the precarbonylation zone.

After passage through the reaction section, the product was depressurized into a cobalt removal zone. Here, the pressure was reduced from 270 to 20 bar. In addition, 2300 kg/h of cobalt salt solution of the abovementioned composition and 9.5 kg/h of air, which had been intensively mixed in a two-fluid nozzle prior to entering the cobalt removal zone, were fed into the cobalt removal zone and then passed through a bubble column at a mean residence time of about 2 minutes. A temperature of 115° C. was established. Immediately downstream of the outlet from the cobalt removal zone, an emulsion breaker was added as a dilute solution in such an amount that the concentration of breaker was 420 mg per metric ton of reaction mixture. The emulsion breaker was a polyethylenimine modified with propylene oxide as described in WO 98/12235.

After the mixing section, 260 kg/h of depressurization gas were separated off in a calming zone and discharged into a collector system. The liquid phases were separated from one another. The aqueous phase was largely free of organic constituents and the content of cobalt carbonyls was only 0.05% by weight. The organic phase still contained about 0.7% by weight of extraneous phase and the cobalt content was 10 ppm. The further work-up was carried out as described in WO 98/12235.

92% of the polyisobutene used had been reacted. 90% of the polyisobutene reacted had been converted into the desired products polyisobutyl aldehyde, polyisobutyl alcohol or polyisobutyl ester. The polyisobutene conversion and the yields of polyisobutenealdehyde, polyisobutyl alcohol or polyisobutyl ester were determined by column chromatography and by determination of parameters.

Example 3
Use of Aqueous Cobalt Carbonyl Solutions as Hydroformylation Catalyst 208 kg/h of aqueous acidic cobalt formate solution whose pH had been adjusted to 3.4 by means of formic acid and which contained 1.3% by weight of cobalt were fed into the above-described precarbonylation reactor. The conversion of the cobalt formate into cobalt carbonyls was carried out at 95° C. by means of a gas mixture of 40% by volume of CO and 59% by volume of $H_2$ (+1% of inert gases). Essentially all the gas necessary for carrying out the hydroformylation was passed through the precarbonylation reactor. After passage through the precarbonylation reactor, 70% of the available cobalt had been converted into hydridocobalt carbonyl. The output from the precarbonylation reactor was conveyed directly to the hydroformylation system.

In addition, 3660 kg/h of a mixture of 1940 kg/h of polyisobutene and 1720 kg/h of a $C_{10}$–$C_{14}$ paraffin fraction were introduced into the hydroformylation reaction system. The reactor system had a reaction volume of 21.7 m³, so that the space velocity through the reaction system was 0.17 kg/l*h.

In the reaction system, the hydroformylation reaction took place at 181° C. The reaction pressure of 270 bar was kept constant by introduction of the necessary amount of synthesis gas. At the bottom of the first reactor of the reaction system, 185 kg/h of an aqueous solution depleted in cobalt carbonyls were taken off and passed to the cobalt removal step.

After passage through the reaction section, the product was depressurized into a cobalt removal zone. Here, the pressure was reduced from 270 bar to 20 bar. In addition, 2300 kg/h of cobalt salt solution of the abovementioned composition and 9.5 kg/h of air, which had been intensively mixed in a two-fluid nozzle prior to entering the cobalt removal zone, were fed into the cobalt removal zone and then passed through a bubble column at a mean residence time of about 2 minutes. A temperature of 115° C. was established. Immediately downstream of the outlet from the cobalt removal zone, an emulsion breaker was added as a dilute solution in such an amount that the concentration of breaker was 420 mg per metric ton of reaction mixture. The emulsion breaker was a polyethylenimine modified with propylene oxide as described in WO 98/12235.

After the mixing section, 360 kg/h of depressurization gas were separated off in a calming zone and discharged into a collector system. The liquid phases were separated from one another. The aqueous phase was largely free of organic constituents and the content of cobalt carbonyls was only 0.05% by weight. The organic phase still contained about 0.7% by weight of extraneous phase and the cobalt content was 10 ppm. The further work-up was carried out as described in WO 98/12235.

88% of the polyisobutene used had been reacted. 90% of the polyisobutene reacted had been converted into the desired products polyisobutyl aldehyde, polyisobutyl alcohol or polyisobutyl ester. The polyisobutene conversion and the yields of polyisobutenealdehyde, polyisobutyl alcohol or polyisobutyl ester were determined by column chromatography and by determination of parameters.

The yield of the desired polyisobutenealdehyde, polyisobutyl alcohol and polyisobutyl ester in both the examples 2 and 3 according to the present invention using cobalt carbonyl preformed outside the reaction zone was considerably higher than that in the comparative example 1 in which an aqueous cobalt formate solution was introduced into the reaction system and cobalt carbonyl formation took place only in the reaction system.

What is claimed is:

1. A process for the continuous hydroformylation of essentially monounsaturated polyalkylenes having from 30 to 700 carbon atoms, in which
    i) a hydroformylation-active cobalt carbonyl catalyst is prepared from a catalyst precursor dissolved in an aqueous phase in the absence of the polyalkylenes,
    ii) the polyalkylenes are hydroformylated by means of synthesis gas in the presence of the cobalt carbonyl catalyst in a reaction zone,
    iii) the cobalt carbonyl catalyst is separated from the output from the reaction zone with at least partial reformation of the catalyst precursor and the catalyst precursor is recirculated to step i).

2. A process as claimed in claim 1 in which the cobalt carbonyl catalyst is dissolved in an organic phase comprising the polyalkylenes and the organic phase laden with the cobalt carbonyl catalyst is introduced into the reaction zone.

3. A process as claimed in claim 2 in which the cobalt carbonyl catalyst is dissolved in the organic phase by bringing an aqueous phase comprising the cobalt carbonyl catalyst into contact with the organic phase, with the cobalt carbonyl catalyst being at least partly extracted into the organic phase.

4. A process as claimed in claim 2 in which the cobalt carbonyl catalyst is dissolved in the organic phase by treating an aqueous phase comprising the cobalt carbonyl catalyst with a stripping gas and bringing the stripping gas laden with the cobalt carbonyl catalyst into contact with the organic phase, with the cobalt carbonyl catalyst being at least partly absorbed in the organic phase.

5. A process as claimed in claim 1 in which an aqueous phase comprising the cobalt carbonyl catalyst and an organic phase comprising the polyalkylenes are introduced simultaneously into the reaction zone.

6. A process as claimed in claim 1 in which the catalyst precursor is a cobalt(II) salt and the cobalt carbonyl catalyst is prepared by treating the catalyst precursor with synthesis gas.

7. A process as claimed in claim 3 in which
    a) an aqueous cobalt(II) salt solution is brought into intimate contact with synthesis gas to form a cobalt carbonyl catalyst,
    b) the aqueous phase comprising the cobalt carbonyl catalyst is brought into contact with an organic phase comprising the polyalkylenes, with the cobalt carbonyl catalyst being at least partly extracted into the organic phase,
    c) the organic phase is hydroformylated by means of synthesis gas at superatmospheric pressure and elevated temperature in the reaction zone,
    d) the output from the reaction zone is treated with oxygen in the presence of aqueous cobalt(II) salt solution, with the cobalt carbonyl catalyst being decomposed to form cobalt(II) salts and the latter being back-extracted into the aqueous phase, and
    e) the aqueous cobalt(II) salt solution is recirculated to step a).

8. A process as claimed in claim 4 in which
    a) a polyalkylene-containing organic phase laden with a cobalt carbonyl catalyst is hydroformylated by means of synthesis gas at superatmospheric pressure and elevated temperature in the reaction zone,
    b) the output from the reaction zone is admixed with an aqueous acid and stripped by means of a stripping gas in the presence of an aqueous phase comprising a cobalt carbonyl catalyst, with the cobalt carbonyl catalyst being at least partly entrained by the stripping gas and partly converted into a water-soluble form and extracted into the aqueous phase,
    c) the aqueous phase is treated with oxygen, with the water-soluble form of the cobalt carbonyl catalyst being decomposed to form cobalt(II) salts,
    d) the aqueous cobalt(II) salt solution is brought into intimate contact with synthesis gas to form a cobalt carbonyl catalyst and the aqueous phase comprising the cobalt carbonyl catalyst is recirculated to step b),
    e) the stripping gas laden with the cobalt carbonyl catalyst from step b) is brought into contact with a polyalkylene-containing organic phase, with the cobalt carbonyl catalyst being at least partly absorbed in the organic phase, and the organic phase is recirculated to step a).

9. A process as claimed in claim 1 in which the catalyst precursor is a salt of the cobalt tetracarbonyl anion and the cobalt carbonyl catalyst is prepared by acidification of the catalyst precursor.

10. A process as claimed in claim 3 in which
   a) an aqueous solution of a salt of the cobalt tetracarbonyl anion is acidified to form a hydroformylation-active cobalt carbonyl catalyst,
   b) the aqueous solution comprising the cobalt carbonyl catalyst is brought into intimate contact with an organic phase comprising the polyalkenes, with the cobalt carbonyl catalyst being at least partly extracted into the organic phase,
   c) the organic phase is hydroformylated in the reaction zone,
   d) the output from the reaction zone is treated with an aqueous solution of a base to reform the cobalt tetracarbonyl anion, and the aqueous solution is recirculated to step a).

11. A process as claimed in claim 1, wherein the hydroformylation is carried out in at least two successive reaction zones.

12. A process as claimed in claim 2 in which the organic phase comprises an inert solvent.

13. A process as claimed in claim 1 in which homopolymers or copolymers of isobutene are used as polyalkylene.

* * * * *